(12) United States Patent
Tsai et al.

(10) Patent No.: US 8,423,718 B2
(45) Date of Patent: Apr. 16, 2013

(54) LOW-OVERHEAD RUN-TIME MEMORY LEAK DETECTION AND RECOVERY

(75) Inventors: Timothy K. Tsai, Alviso, CA (US); Kalyanaraman Vaidyanathan, San Diego, CA (US); Kenny Clayton Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 0 days.

(21) Appl. No.: 13/165,482

(22) Filed: Jun. 21, 2011

(65) Prior Publication Data
US 2011/0252276 A1    Oct. 13, 2011

Related U.S. Application Data

(63) Continuation of application No. 11/872,626, filed on Oct. 15, 2007, now Pat. No. 7,991,961.

(51) Int. Cl.
*G06F 12/00*    (2006.01)
(52) U.S. Cl.
USPC .................. 711/132; 714/25; 714/42; 714/48
(58) Field of Classification Search .................. 711/132; 714/25, 42, 48
See application file for complete search history.

(56) References Cited

U.S. PATENT DOCUMENTS

| | | | |
|---|---|---|---|
| 6,125,434 A * | 9/2000 | Willard et al. ................. | 711/170 |
| 6,629,266 B1 | 9/2003 | Harper et al. | |
| 6,865,585 B1 * | 3/2005 | Dussud ................................. | 1/1 |
| 7,100,079 B2 | 8/2006 | Gross et al. | |
| 2002/0078404 A1 * | 6/2002 | Vachon et al. .................. | 714/38 |
| 2004/0205399 A1 | 10/2004 | Wang et al. | |
| 2005/0114844 A1 | 5/2005 | Betancourt et al. | |
| 2006/0080364 A1 | 4/2006 | Lake | |

OTHER PUBLICATIONS

IEEE 100 The Authoritative Dictionary of IEEE Standards Terms, Seventh Edition, 2000, p. 210.*
Gross, Kenny C. et al., "Proactive Detection of Software Aging Mechanisms in Performance Critical Computers," Software Engineering Workshop, Dec. 2002, 7 pages.
Benson, Robert, "Identifying Memory Management Bugs Within Applications Using the Libumem Library," http://developers.sun.com/solaris/articles/libumem_library.html, Jun. 2003, 12 pages.
Sun Microsystems, Inc., Solaris Modular Debugger Guide, May 2002, 162 pages.

(Continued)

*Primary Examiner* — Jared Rutz
*Assistant Examiner* — Gurtej Bansal
(74) *Attorney, Agent, or Firm* — Osha Liang LLP

(57) ABSTRACT

Leaked memory in a computer system is detected and recovered by first detecting memory leakage within the computer system based on nonlinear and non-parametric time-series regression analysis of software telemetry data generated by one or more software process running on the computer system. If existence of memory leakage is detected, then memory that has leaked is specifically identified and recovered. This is done by halting one or more of the software processes, generating a core image file or files of the halted software process(es), and re-starting the halted process or processes without waiting for analysis of the core image file(s). Then, the core image file is evaluated to specifically identify leaked memory in the computer system based on the core image file. Finally, the identified leaked memory is recovered.

17 Claims, 5 Drawing Sheets

OTHER PUBLICATIONS

Tsai, Timothy et al., "Low-Overhead Run-Time Memory Leak Detection and Recovery," 12th Pacific Rim International Symposium on Dependable Computing (PRDC '06), Dec. 2006, 9 pages.

Goetz, Brian, "Java Theory and Practice: A Brief History of Garbage Collection," IBM Corporation, developerWorks, http://www-128.ibm.com/developerworks/java/library/j-jtp10283, Oct. 2003, 6 pages.

Goettler, Henry et al., "When a Customer Escalates . . . ," Service and Support Professionals Association (SSPA), http://www.thesspa.com/sspanews/111803/article3.asp, Nov. 2003, 2 pages.

Adam Leventhal's Weblog, http://blogs.sun.com/ahl/entry/solaris_10_top_11_20, Jul. 2004, 5 pages.

Blog O'Matty, "Finding Memory leaks on Solaris Systems," http://prefetch.net/blog/index.php/2006/02/19/finding-memory-leaks-on-solaris-systems, Feb. 2006, 3 pages.

OpenSolaris.org, "OpenSolaris Community: Modular Debugger (MDB)," http://opensolaris.org/os/community/mdb, Sep. 2006, 2 pages.

* cited by examiner

LOW-OVERHEAD RUN-TIME MEMORY LEAK DETECTION AND RECOVERY

This application is a continuation application and claims benefit under 35 U.S.C. §120 of U.S. patent application Ser. No. 11/872,626, now U.S. Pat. No. 7,991,961 filed on Oct. 15, 2007, and entitled "Low-Overhead Run-Time Memory Leak Detection and Recovery."

FIELD OF THE INVENTION

Exemplary embodiments of the invention are directed to detecting occurrence of memory leakage, and identifying and recovering leaked memory.

BACKGROUND OF THE INVENTION

Memory leaks and related resource exhaustion/resource-contention problems can degrade software reliability. Memory leaks can remain in programs despite extensive tests in the development phase and can consume enough of a server's resources to seriously hinder performance or even cause application hangs or system crashes. This problem can become more acute in a multi-user environment where a large number of users can be affected by a single application, process, or collection of interacting processes exhibiting memory leaks. If applications or processes with memory leaks can be detected well in advance, preventive recovery actions can be taken to avoid potentially catastrophic failures affecting many users.

In many programming languages, it is possible to allocate memory for objects (or variables) dynamically during program execution. After the dynamically allocated object is used and there is no more need for it, it is necessary to explicitly release the memory consumed by the object. Failure to free 100% of the memory allocated results in a memory leak in the program. Memory leaks are also associated with programming errors in which a program gradually loses the ability to release non-useful memory. For example, an error might overwrite a pointer to a memory area thus rendering the memory unreachable and preventing the program from either utilizing the memory or freeing it. Memory leaks are common in programming languages like C and C++, which rely heavily on pointer arithmetic and do not implement or mandate "garbage collection".

The main problem with a memory leak is that it results in an ever growing amount of memory being used by the system as a whole, not merely by the erroneous process/program. Eventually, all (or too much) of the available memory may be allocated (and not freed), and performance for the entire system can become severely degraded or can even crash. This problem is compounded in a multi-user environment as even one offending process or application can affect all of the users. System administrators typically do not get an alarm that there is a problem until about 95% of the available memory has been used up. Moreover, well before the system administrators start taking remedial actions, individual users' applications may start requesting more memory than available, which causes them to swap to disk and can decrease performance and increase transaction latencies tremendously.

Prior art has mostly focused on three aspects.

First, memory leak detection when the program source code is available for analysis. However, this approach is generally not an option for end-user customers who may have large commercial software systems competing for resources in multi-user environments, or when third-party and off-the-shelf software is used.

Second, memory leak detection and recovery during runtime. Memory leak detection and removal (or recovery of leaked memory) for runtime systems is often called garbage collection. One of the significant challenges for garbage collection is the additional performance overhead incurred. This overhead is particularly conspicuous for the mark-sweep approaches because they require a temporary suspension of the application while the algorithm is executed.

Third, detecting gradual system resource exhaustion in systems. Time series analysis is used to detect trends and estimate times to resource exhaustion. See, for example, U.S. Pat. No. 7,100,079. Preventive action (such as software rejuvenation) is performed to avoid any impending failure. However, identifying or pinpointing an offending application or process can be extremely difficult, for example in a multi-user environment with a very chaotic system memory usage profile. The entire system may have to be rebooted.

BRIEF SUMMARY OF THE INVENTION

In accordance with an exemplary method, leaked memory in a computer system is detected and recovered by first detecting memory leakage within the computer system based on nonlinear and non-parametric time-series regression analysis of software telemetry data generated by one or more software process running on the computer system. If existence of memory leakage is detected, then memory that has leaked is specifically identified and recovered. This is done by halting one or more of the software processes, generating a core image file or files of the halted software process(es), and re-starting the halted process or processes without waiting for analysis of the core image file(s). Then, the core image file is evaluated to specifically identify leaked memory in the computer system. Finally, the identified leaked memory is recovered.

In addition, time intervals can be used, for example to generate core image files and recover memory upon expiration of a time interval, and then use the results to train the memory leakage detection mechanism and/or compensate for shortcomings of the memory leakage detection. In accordance with an exemplary embodiment, upon expiration of a time interval one or more running software processes are halted, core image files are generated, the halted processes are restarted, the core image files are analyzed to identify leaked memory, and the identified leaked memory is then recovered. The results of this process such as amount or quality of recovered leaked memory can be used to train or tune memory leakage detection (e.g., recognizing whether memory is leaking, vis a vis specifically identifying and recovering leaked memory). In an exemplary embodiment, the results are additionally or alternatively used to adjust the length of the time interval to obtain a favorable compromise balance between overhead to perform the identification and recovery process, and memory recovered. For example, if an amount of recovered memory is below a threshold value, then the time interval can be increased.

In an exemplary embodiment, generating the core image files occurs during a checkpointing halt of the at least one software process, as for example in systems that employ application checkpointing.

DETAILED DESCRIPTION OF THE INVENTION

Figure 1:
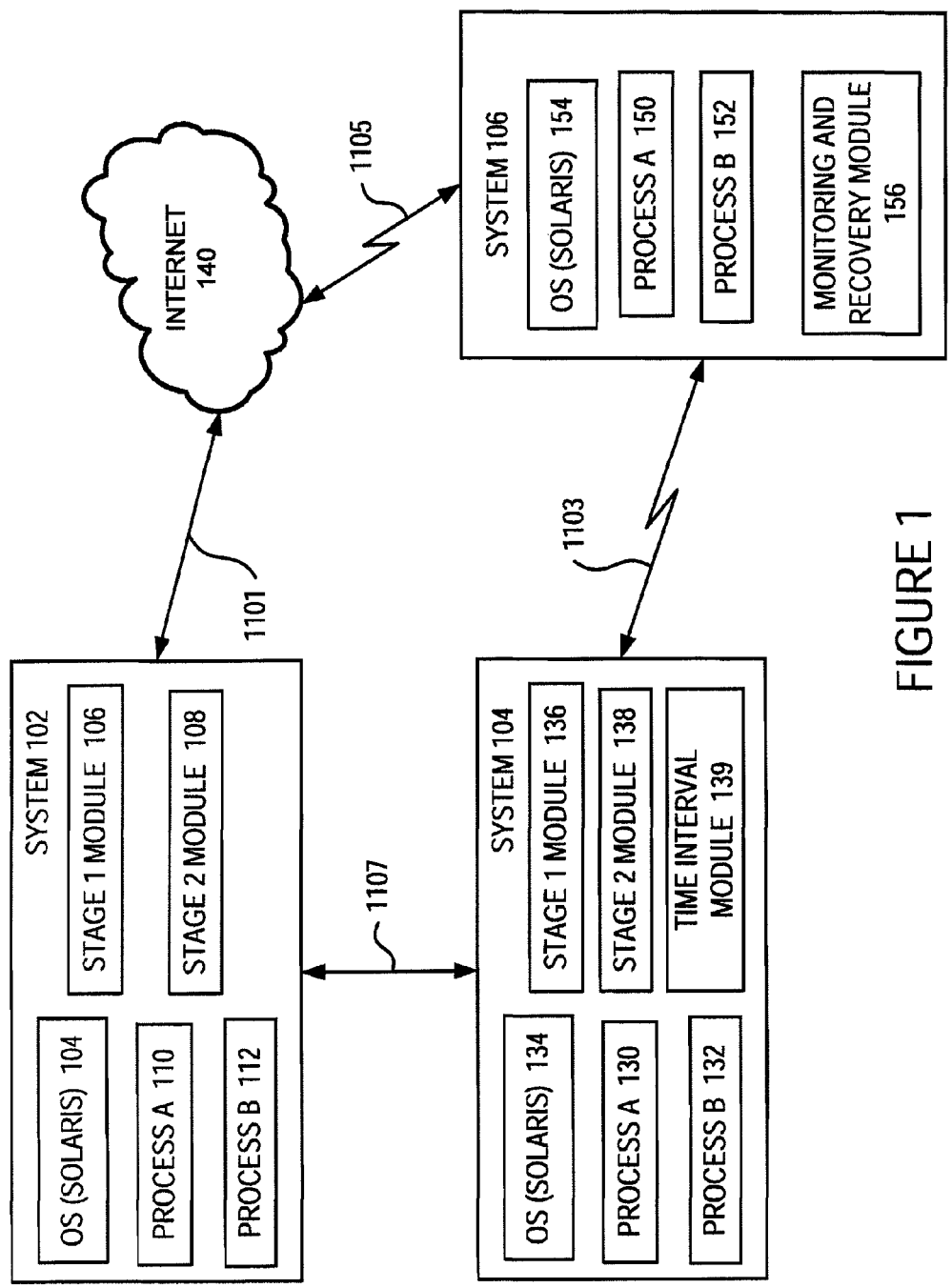
FIG. 1 is a block system and network diagram illustrating high-level implementation consistent with exemplary embodiments of the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In accordance with an exemplary method, leaked memory in a computer system is detected and recovered by first detecting memory leakage within a computer system based on nonlinear and non-parametric time-series regression analysis of software telemetry data generated by one or more software processes running on the computer system. If existence of memory leakage is detected, then memory that has leaked is specifically identified and recovered. This is done by halting one or more of the software processes, generating a core image file or files of the halted software process(es), and re-starting the halted process or processes without waiting for analysis of the core image file(s). Then, the core image file is evaluated to specifically identify leaked memory in the computer system based on the core image file. Finally, the identified leaked memory is recovered. In an example embodiment, the core image file is generated before re-starting the halted process.

In a broad sense the invention encompasses a two-stage technique to address memory-leak detection and garbage collection performance overhead concerns in two ways: (1) utilizing an advanced pattern recognition technique to minimize the need for suspension of the application and execution of the mark-sweep algorithm, and (2) implementing a mark-sweep algorithm that permits off-line execution and thus allows the application to resume execution before the entire SAR (software aging and rejuvenation) algorithm is finished. An aspect of exemplary embodiments of the invention is a symbiotic combination of two memory leak detection stages to both minimize overhead and effectively detect and mitigate memory leaks. The detecting of memory leakage can be performed in a first phase or stage, and the specific identification and recovery of leaked memory can be performed in a second phase or stage. For example, stage one can employ a statistical pattern recognition technique that can raise alarms for memory leak situations at a system level as well as at an application level. Because stage one can incur low or virtually no overhead, continuous monitoring of an entire system is practical. When stage one raises an alarm that memory leakage is occurring, stage two is invoked to perform low-level, conservative, mark-sweep memory detection and removal. When stage one is implemented with monitoring of individual applications, invocation of stage two can be limited to the indicated application, e.g. an application that stage one indicates is leaking memory. Otherwise, stage two can be either invoked for all applications or a limited subset of applications based on a separate algorithm, such as selection of the n applications that currently utilize the greatest amount of virtual memory.

FIG. 1 illustrates a block diagram of an exemplary operating environment of embodiments of the invention, where a first computer system 102 includes operating system software 104 (e.g., Sun Solaris) and one or more software processes, for example Process A (110) and Process B (112). Also running within the system 102 is a stage 1 software module 106 that detects memory leakage within a computer system based on nonlinear and non-parametric time-series regression analysis of software telemetry data generated by one or more of the processes A (110), B (112). A stage 2 module 108 within the system 102 halts or controls halting of the one or more processes, directs generation of core image files, controls restarting of the halted process(es), evaluates the core image file(s) to specifically identify memory leaked by the processes, and recovers or directs recovery of the leaked memory. The system 104 includes corresponding elements or modules, for example an operating system 134, process A (130), process B (132), stage 1 module 136, and stage 2 module 138. The stage 1, 2 modules can for example be combined in a single module, as in the monitoring and recovery module 156 of system 106, which also includes an operating system 154 and one or more software processes, such as the process A (150) and process B (152). In exemplary embodiments, the monitoring, identifying and recovering software modules or functions can be variously collected in a single module on a single system (e.g. as in module 156), distributed among multiple modules in a single system, or distributed among different locations of a distributed system or collection of systems. The different locations can communicate for example via links 1107, 1101, and/or via wireless links such as 1103, 1105, and/or indirectly for example through the Internet 140 or other network.

Figure 5:
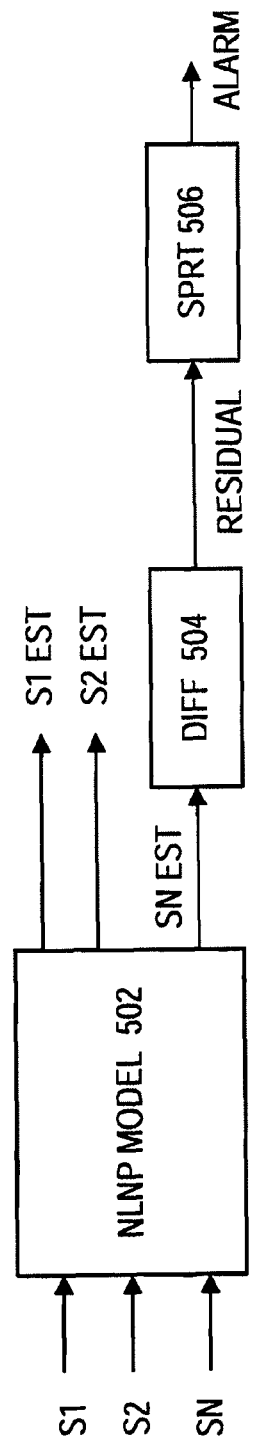
FIG. 5 illustrates an exemplary implementation of a nonlinear, non-parametric model for recognizing presence or occurrence of memory leakage.

The stage 1 modules 106, 136 and corresponding functions of module 156 can be implemented, for example, using the model shown in FIG. 5 and described elsewhere herein.

The system 104 is also shown as including a time interval module 139, which can trigger or prompt the stage 2 module to specifically identify and recover leaked memory upon expiration of a time interval, for example a recurring time interval. This time interval will be further discussed with respect to FIG. 2. A time interval module can be included with each system, can be incorporated into one or both of the stage 1, 2 modules or into a single module that also performs stage 1, 2 functions (e.g., the module 156).

Figure 2:
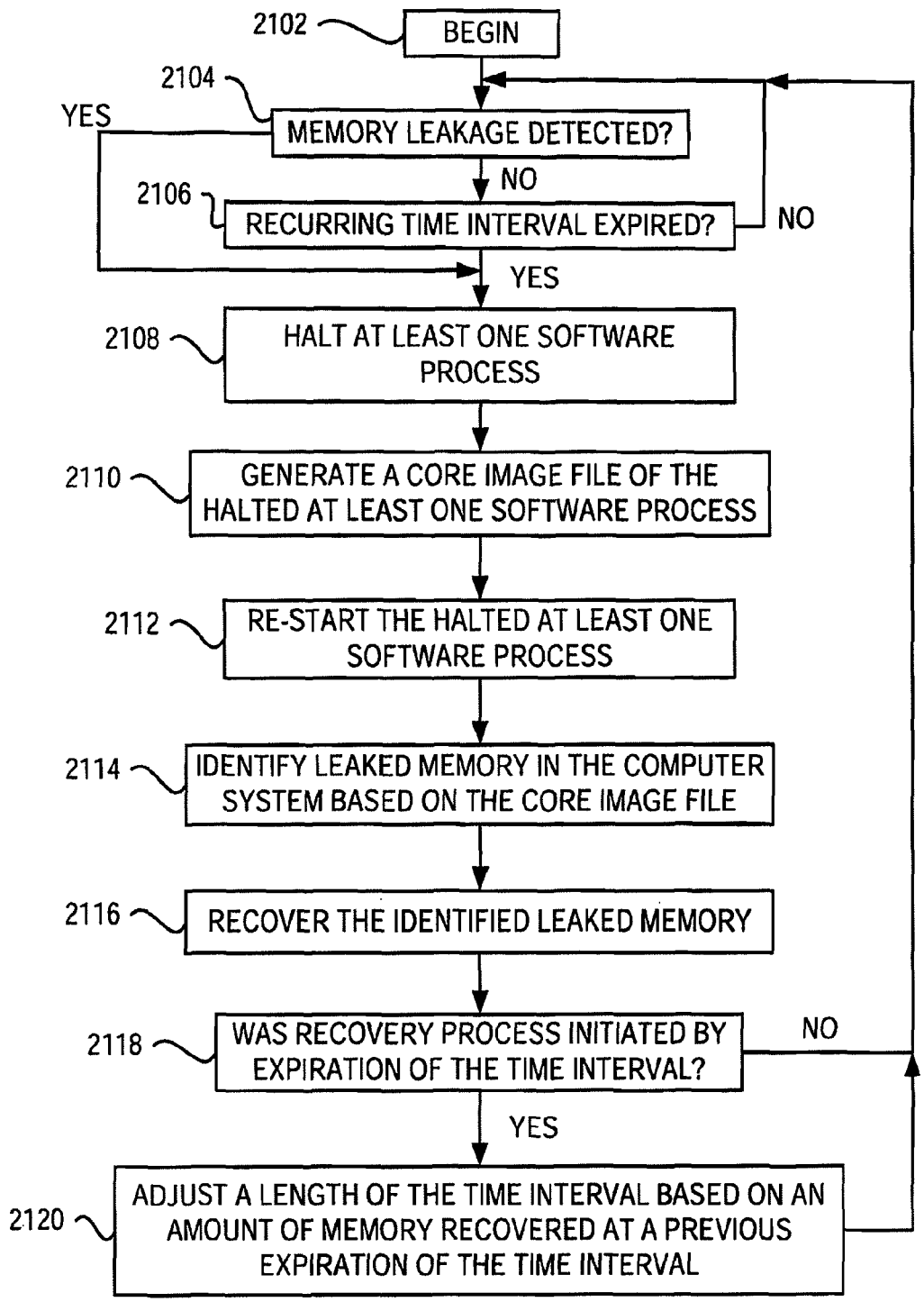
FIG. 2 is a flow diagram of an exemplary embodiment of the invention.

FIG. 2 is a flow diagram illustrating an exemplary method in accordance with exemplary embodiments of the invention.

The process begins with block 2102, and proceeds to block 2104, where a determination is made as to whether memory is leaking. This can be performed using, for example, nonlinear and non-parametric time-series regression analysis of software telemetry data generated by one or more software process running on the computer system. The functions of Block 2104 can, for example, be performed by one or more of the modules 106, 136, 156 shown in FIG. 1.

Generally, software telemetry data is data that is collected automatically by tools that are unobtrusively monitoring some form of state in a software environment. Software telemetry data includes a stream of time-stamped values, and the time-stamp can be significant (in the sense that the values of the metric will vary with time and can be used in analysis.) The telemetry data can variously include, for example, CPU (central processing unit) utilization, memory usage, swap usage, and paging activity. The telemetry data can variously include data or metrics that indicate a gradual slow down in performance of a software process or application, and changes in memory usage such as a temporary spike in memory usage, and counter values such as configuring an object via the GUI. The telemetry data can variously include counter values or other metrics that suggest memory leakage, for example: a decrease in available memory; gradually worsening response time; an increase in a number or amount of private bytes committed to processes (this tends to rise during a memory leak); an increase in a number of bytes or amount of memory allocated exclusively for a specific process; an increasing number of shared and private bytes allocated to a process tends to rise for a leaking process; an increasing, total number of faults (hard and soft faults) caused by a process; an increasing size of a paging file (which tends to rise during a memory leak); an increasing number of handles that an application opens for objects it creates (handles are used by programs to identify resources they must access); and so forth.

In exemplary embodiments the method used for analysis of the telemetry data, is a nonlinear, nonparametric (NLNP) time-series regression approach or method for analyzing the telemetry data to detect presence or occurrence of memory leakage, can include techniques like kernel regression, neural networks, and Kalman filtering. In an exemplary embodiment, an overall framework can include a training phase and a monitoring phase. In the training phase, the NLNP software module learns the signal correlations of a new (or at least non-degraded) system and produces a model that can then be used in the monitoring phase to estimate the value of any signal at time t as a function of the other correlated signals. Any discrepancy between a signal's predicted value and its directly sensed value, or any discrepancy exceeding a corresponding threshold, results in an alarm. Note that the threshold values or other mechanisms that control sensitivity of the NLNP or stage one module (e.g., provide an alarm or alert that will trigger stage two recovery of leaked memory or "garbage collection"), can be adjusted to balance overhead cost of monitoring for memory leakage (and/or specifically identifying and recovering leaked memory), against amounts of memory that may be recovered. For example, if an amount of memory recovered exceeds a first predetermined threshold, then sensitivity of the NLNP or stage one module can be increased. If an amount of memory recovered is below a second predetermined threshold (which can be different from the first predetermined threshold, e.g. less than the first predetermined threshold), then sensitivity of the NLNP or stage one module can be increased. Known techniques of feedback control can be used to select and/or dynamically adjust the predetermined thresholds and increments or decrements in sensitivity of the NLNP or stage one module. Thus an amount of memory recovered in stage two can be a feedback measure with which to adjust sensitivity of the first stage. The NLNP time-series regression approach or method can thus provide a high-sensitivity, low false-alarm indication of system performance degradation or impending failure.

Returning to FIG. 2, if memory leakage is detected in block 2104, then control proceeds to block 2108, where the second stage of specifically identifying and recovering leaked memory begins. If the determination in block 2104 is negative, then control proceeds from block 2104 to block 2106, where a determination is made as to whether a time interval has expired. If not, then control returns to block 2104. If yes, then control proceeds to block 2108.

The time interval of block 2106 can be used, for example, to trigger specific identification and recovery of leaked memory without waiting for an alarm or alert from the first stage. This can be useful, for example, to train or tune the first stage by using the results as feedback for comparison purposes to the first stage, and/or can be used to compensate for weaknesses or blind spots of the first stage monitoring algorithm. In an exemplary embodiment, the results (e.g., an amount of memory recovered upon expiration of the time interval) can be used to adjust a length of the time interval. For example, if the amount of recovered memory is large or above a threshold value, then the time interval can be shortened and restarted. If the amount of recovered memory is below a threshold value (which can be a different threshold value), then the time interval can be lengthened, or even suspended (e.g. made infinite). Thus, the time interval can be adjusted to balance overhead cost of specifically identifying and recovering leaked memory, against an amount of memory that may be recovered. In an exemplary embodiment, when specific identification and recovery of leaked memory is triggered by expiration of the time interval (e.g., when block 2108 is entered from block 2106 in FIG. 2), a processes or subsets of processes running on the system can be halted in a round robin fashion (e.g. one process or subset upon expiration of the time interval, and then a next process or subset upon next expiration of the time interval, and so forth). The time interval can be adjusted based on which process or subset of processes will be halted upon the interval's next expiration and an amount of leaked memory that was recovered the last time that process or subset was halted. Alternatively or additionally, all processes can be periodically halted upon expiration of the time interval. In an exemplary embodiment, one or more processes with a greatest increase in memory usage since a beginning of a time interval (e.g., the time interval of block 2106 in FIG. 2) can be selected and then halted. In an exemplary embodiment, in a multiprocessing system, multiple processes can be halted in parallel. In an exemplary embodiment, multiple time intervals can be simultaneously used. The time interval functions of blocks 2106, 2120 can, for example, be performed by the time interval module 139 shown in FIG. 1.

Figure 4:
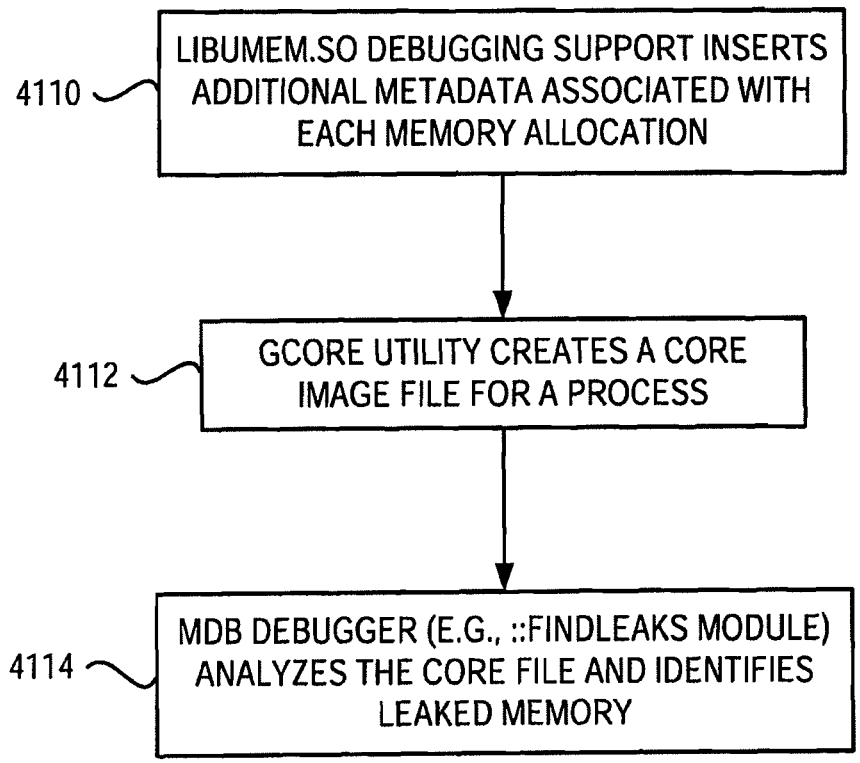
FIG. 4 illustrates exemplary implementation of aspects of an embodiment of the invention.

In block 2108, the one or more processes specified in block 2104 or block 2106 is halted. From block 2108 control proceeds to block 2110, where a core image file of each halted process is generated.

Where the invention is implemented in the context of a Sun Microsystems Solaris operating system, the core image file of block 2110 can be generated by the Solaris utility "gcore". In particular, for example, the leaked memory identification process outlined in blocks 2108-2114 can be implemented based on, or using, three Solaris software components: libumem.so, gcore, and mdb. Libumem.so is a user-space slab allocator that manages userspace dynamic memory. More importantly, libumem.so also provides debugging support that is useful for detecting memory leaks. As shown in FIG. 4, libumem.so's debugging support inserts additional metadata associated with each memory allocation (block 4110). The gcore utility creates a core image file for a process (FIG. 4, block 4112). When used for a process loaded with libumem.so, the core image file also contains the debugging metadata. This core file is then analyzed by the mdb debugger (FIG. 4, block 4114), a flexible debugger that supports both kernel and user process debugging with a large assortment of modules. Of particular interest is the ::findleaks module which analyzes the core file and identifies memory leaks, using a conservative mark-sweep algorithm.

Conservative "garbage collection" techniques often follow either a reference-count or a mark-sweep strategy. Both strategies attempt to identify objects that are still live or in use by the application. The reference-count strategy maintains a current count of the references to each object by incrementing the count whenever a pointer is set to refer to the object and decrementing the count whenever a reference is deleted. When the count for a particular object reaches zero, the memory for that object can be freed. The implementation of a reference-count strategy requires compiler or run-time environment support for maintenance of reference counts. The mark-sweep strategy attempts to accomplish the same goal without requiring current counts of references to objects. Instead, an on-demand traversal of memory is used to mark objects that are currently the target of at least one reference. Upon completion of the traversal, all objects that have not been marked as a reference target are designated for de-allocation/recovery.

Exemplary embodiments described herein, use a conservative garbage collection algorithm that is based on the mark-sweep approach. One of the significant challenges for garbage collection is the additional performance overhead incurred. This overhead can be particularly conspicuous for the mark-sweep approaches because they require a temporary suspension of the application while the algorithm is executed. As described herein, exemplary embodiments can address these performance concerns in two ways: (1) utilize an advanced pattern recognition technique to minimize the need for suspension of the application and execution of the mark-sweep algorithm, and (2) implement the mark-sweep algorithm to permit off-line execution and thus allow the application to resume execution before the entire algorithm is finished. Alternatively, exemplary embodiments can use other garbage collection techniques, for example reference count or other technique, that permits at least some off-line execution.

Returning now to a discussion of Solaris tools, note that in the past, application of tools such as mdb, libumem.so, and gcore, required active human insight and involvement to decide when and where the tools would be applied. In accordance with exemplary embodiments of the present invention, stage one and stage two modules (or, e.g., the module 156) automatically manage the process(es) of monitoring memory leakage and identifying and recovering leaked memory, using for example the libumem.so, gcore, and mdb tools of the Solaris operating system. Thus early detection of the onset of subtle memory leaks can be automated in stage one, triggering remediation with targeted recovery actions (e.g., stage two with higher overhead) only when warranted.

Returning now to FIG. 2, from block 2110 control proceeds to block 2112, where at least one of the halted software process (or processes) is restarted. Thus, analysis to specifically determine or identify leaked memory for recovery, need not unduly slow or disrupt the software processes running on the computer system. In an exemplary embodiment, all the processes halted in block 2108 are restarted in block 2112. From block 2112 control proceeds to block 2114, where leaked memory within the system is specifically identified by analyzing or evaluating the core image file(s). From block 2114 control proceeds to block 2116, where the identified leaked memory is recovered.

From block 2116 control proceeds to block 2118, where a determination was made if the recovery process was triggered by expiration of the time interval, or by an alarm or prompt from the first stage (e.g., NLNP time-series regression analysis of software process telemetry data). If by alarm or prompt from the first stage, then control returns directly to block 2104. Instead of proceeding directly from block 2118 to block 2104, in an exemplary embodiment a sensitivity of the first stage can be adjusted based on an amount of memory recovered in block 2116, and then control can return to block 2104. If the recovery process was triggered by expiration of the time interval, then control proceeds from block 2118 to block 2120, where a length of the time interval is adjusted, for example based on an amount of memory recovered at a previous expiration of the time interval.

Note that the functions of blocks 2108-2118 can for example be performed by one or more of the modules 108, 138, 156.

Figure 3:
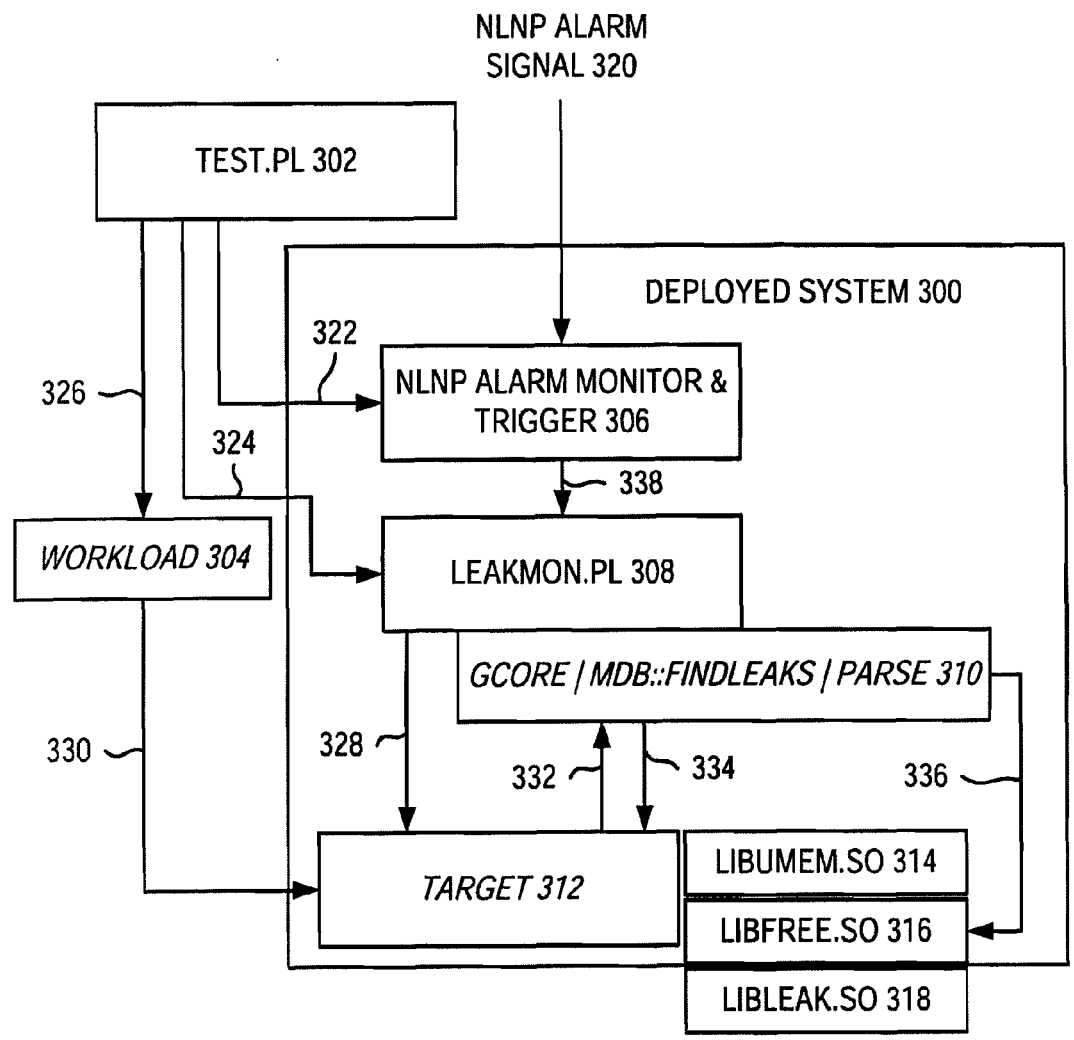
FIG. 3 illustrates an exemplary software architecture of an embodiment of the invention.

FIG. 3 illustrates an exemplary software architecture of an embodiment of the present invention. FIG. 3 illustrates a deployed system 300 running a target program 312. Also running on the system 300 are an NLNP alarm monitor and trigger 306 to receive alarms or prompts from a NLNP time series regression analysis module (e.g., module 106, 136) indicating that memory leakage is occurring, and can automatically direct or coordinate leaked memory identification and recovery via a script element "leakmon.pl" 308, a element 310 containing "gcore" and "mdb", and shared libraries "libumem.so" 314 and "libfree.so" 316, where the gcore, mdb, and libumem.so elements or components are tools that are part of or available through the Sun Microsystems Solaris operating system. Thus the elements 306, 308, 310, 314, 316 can together form a stage two module, like the modules 108, 138. Although FIG. 3 shows the signal 320 coming from outside the system 300, as for example where the stage one and stage two functions are distributed across multiple systems, the system 300 can instead include a stage one module such as the modules 106, 136, or can combine stage one and two modules on the system 300 via a single module, for example like module 156. 1.

FIG. 3 also illustrates optional components 302, 304, 318 to implement an experimental testbed, and these will be described after general operation of the deployed system 300.

In general operation the deployed system 300 is initiated via the leakmon.pl script 308, which starts the target program 312 and, based on NLNP alarms (320), calls the components that detect memory leaks and correct memory leaks. Thus, stage two memory leak detection and recovery can be performed via the following series of commands:

1. The gcore utility (310) temporarily suspends the target program 312 and creates a core image of the entire process memory space. After the core image is obtained, execution of the target program 312 can be resumed.

2. The core image is passed to the mdb debugger, which inspects the core image using the ::findleaks module (310) to detect memory leaks.

3. The raw output from the mdb debugger (310) is further parsed by the parse script (310) to produce a list of memory leaks, including associated addresses and sizes.

In an exemplary embodiment, only the first command utilizing the gcore utility (310) requires temporary suspension of target program (312) execution. The other commands can be performed off-line if additional hardware processing resources (additional hardware threads, cores, processors, or systems) are available. If no additional hardware processing resources are available, the remaining commands can be performed either by temporarily suspending the target program or by executing the commands as low-priority processes that utilize otherwise idle processor cycles. If the target program is temporarily suspended for all commands above, then execution of the target program must be resumed before proceeding to the following forcible memory leak removal steps.

From the list of memory leaks, the leakmon.pl script 308 passes the addresses for all memory leaks to the libfree.so shared library 316. The libfree.so shared library 316 creates a thread that executes in the context of the target program 312 and is thus able to call a "free( )" function and forcibly deallocate the leaked memory. The forcible deallocation of identified leaked memory can be safely performed even though the application 312 has resumed execution because once the application 312 discards all references to a memory object, the application does not know the location of the object and therefore is not capable of regenerating a reference to that object.

Periodic checking (without alerts or alarms from the NLNP module) can also be performed, but can incur a periodic overhead that can be significantly greater than the overhead for NLNP monitoring, depending for example on a frequency of the periodic checking and an amount of leaked memory recovered or expected to be recovered. The period between such invocations by the leakmon.pl script can be called a check period. Duration of the check period can be constant or fixed, or can vary as described elsewhere herein.

As noted herein, FIG. 3 also illustrates optional components, in particular a script "test.pl" 302, a script "workload" 304, and a shared library "libleak.so" 318. To help test or evaluate the memory leak detection effectiveness, memory leak faults can be inserted with the use of the libleak.so library 318. This library can be used purely for testing the effectiveness of the detection approach and is not needed for the actual detection and recovery of leaked memory.

When the system 300 is operated in conjunction with the test bed, the test.pl script 302 initiates all activity for the prototype by starting (1) the deployed system 300 and (2) the workload script 304. The workload script 304 generates a set of repeatable inputs for the target program 312, such as creating input files or generating input via standard input or sockets. The target program 312 is linked with the libumem.so library. The test.pl script 302 spawns (322, 324, 326) or triggers operations with respect to the monitor 306, leakmon.pl script 308, and workload script 304. When the alarm signal 320 indicates that memory leakage is occurring, the monitor 306 communicates (338) with the leakmon.pl script 308, and the leakmon.pl script 308 then communicates with the target program 312 (spawn 332) and also communicates with the gcore, mdb elements 310. The gcore, mdb elements 310 exchange data and signals (332, 334) with the target program 312, and the leakmon.pl 308, gcore/mdb element 310, libumem.so 314, and libfree.so 316 work together to variously stop and restart the target process 312, generate and analyze a core file to specifically identify leaked memory, and reclaim or recover the leaked memory identified by the analysis (e.g. via the libfree.so 316). Thus, based on alarms or prompts (320) sent by the NLNP module, the leakmon.pl script 308 invokes the gcore, mdb, and parse components (310) to perform memory leak detection. If leaks are found, the libfree.so component (316) is used to forcibly deallocate the leaked memory and thus recover it.

In particular, the test.pl script initiates all activity for the prototype by starting (1) the deployed system and (2) the workload script. The workload script generates a set of repeatable inputs for the target program, such as creating input files or generating input via standard input or sockets. Some experiments can require injection of memory leak faults in order to provide a known set of memory leaks against which to evaluate the effectiveness of the prototype memory leak detection algorithm. A memory leak injector can be implemented in the libleak.so shared library, for example to introduce faults that are omissions to call a free( ) function for allocated memory. For many operating systems, including for example Solaris, the order of loading for shared libraries is important for determining the library functions that are dynamically linked to a process. By creating or providing a free( ) function in the libleak.so library and loading the libleak.so library before the malloc library where the original free( ) is implemented, it is possible to effectively intercept all calls made by the target program to the free( ) function. Under fault-free operation, the libleak.so free( ) function simply calls the malloc library version. To inject a fault, the libleak.so free( ) function returns without calling the malloc library version. By injecting faults in this manner, the target program continues with the mistaken belief that the memory has been deallocated. Because the target program never uses the memory nor frees the memory from that point in time onwards, the memory becomes a memory leak. Furthermore, in order to emulate a real programming bug, in which the call to free( ) has been erroneously omitted from the source code, libleak.so remembers the callsite address from which free( ) is called. Each callsite is determined to be either a faulty callsite or a fault-free callsite. Thus, once a fault has been injected for a particular callsite, all further calls to free from that callsite will be faulty. The libfree.so library can be implemented in a manner that is similar to the libleak.so library. In this case, to prevent unintended interaction between libleak.so and libfree.so, which both contain implementations of free( ) the libleak.so library is loaded first, and both libraries call the version of free( ) in the malloc library directly.

FIG. 5 illustrates an exemplary implementation of a non-linear, non-parametric model for recognizing presence or occurrence of memory leakage. FIG. 5 illustrates an exemplary multivariate state estimate technique (MSET) for a non-linear, non-parametric modeling method that can be used to implement the first stage module functions described herein. The MSET technique was originally developed by Argonne National Lab (ANL) for high-sensitivity proactive fault monitoring applications in commercial nuclear power applications where plant downtime can cost utilities and their constituents on the order of one million dollars a day. MSET techniques have been successfully applied in a number of reliability-critical applications, including monitoring of NASA Space Shuttle's main launch vehicle engine sensors, military gas turbine engines, industrial process equipment, high-performance computers, commercial jet engines, and nuclear power plant sensors. Herein, MSET refers to generic non-linear, non-parametric regression and not to any commercial implementation. A block diagram of MSET operation is shown in FIG. 5. The MSET framework consists of a training phase and a monitoring phase. The training procedure is used to characterize the monitored equipment using historical, error-free operating data covering the envelope of possible operating regimes for the system variables under surveillance. This training procedure processes and evaluates the available training data S1, S2, . . . , SN (e.g., N elements of data) in FIG. 5, then selects a subset of the data observations that are determined to best characterize the monitored asset's normal operation. It creates a stored model of the equipment based on the relationships among the various signals. Some degree of correlation, linear or non-linear, among the signals is necessary for the model. This model (502) is then used in the monitoring procedure to estimate the expected values of the signals under surveillance. In the monitoring phase, new observations for all the system signals are first acquired. These observations are then used in conjunction with the previously trained MSET model 502 to estimate the expected values of the signals S1 est, S2 est, . . . , SN est in FIG. 5. MSET estimates are typically extremely accurate, with error rates that are usually only 1 to 2 percent of the standard deviation of the input signal. A diff module 504 generates a difference between a signal's predicted value and its directly sensed value, and this difference is termed a "residual". The residuals for each monitored signal are used as an anomaly indicator for sensor and equipment faults. Instead of using simple thresholds to detect fault indications, MSET's fault detection procedure employs a SPRT (sequential probability ratio test) 506 that receives the residual(s) from the diff 504 module to determine whether the residual error value is uncharacteristic of the learned process model and thereby indicative of a sensor or equipment fault. If the SPRT 506 determines that the residual error value is uncharacteristic, then it outputs an alarm, which can for example form the signal 320 of FIG. 3. The SPRT algorithm is a significant improvement over conventional threshold detection processes in that it provides more definitive information about signal validity with a quantitative confidence factor through the use of statistical hypothesis testing. This approach allows the user to specify false alarm and missed alarm probabilities, allowing control over the likelihood of false alarms or missed detection. This is a superior surveillance approach since the SPRT is sensitive not only to disturbances in the signal mean, but also to very subtle changes in the statistical quality (variance, skewness, bias) of the signals. For sudden, gross failures of a sensor or component under surveillance, the SPRT procedure annunciates the disturbance as fast as a conventional threshold limit check. However, for slow degradation, this procedure can detect the incipience or onset of the disturbance long before it would be apparent with conventional threshold limits.

In an exemplary embodiment, instead of implementing only one MSET or stage one module in a system, multiple MSET or stage one modules can be implemented or instantiated, for example one for reach target process or application running on the system. This can enable checking and debugging of an application only when there are alarms from the MSET or stage one module relating to that application, thus further reducing overhead.

Additional economies or performance improvements can also be realized in exemplary embodiments. For example, for simplicity, the core image produced by the Solaris gcore utility can be saved to disk and then immediately read from disk by the Solaris mdb utility. The time to write to disk as well as the disk space can be saved by keeping the core image in memory for use by the mdb utility. However, for large core images, this might introduce some undesirable effects by displacing the target application's virtual pages from physical memory and causing additional swapping from disk. Second, if the glue logic to control the mdb utility and post-process the output of the mdb utility is implemented as a Perl script, then additional speedup can be achieved by implementing the glue logic in a lower-overhead language. Third, the Solaris utilities described herein were created with other uses in mind, and therefore only a small portion of their full functionality is needed by exemplary embodiments of the invention. Thus, to further minimize overhead, custom-designed utilities that combine the minimal gcore and mdb functions needed for the operations variously described herein can be created. This would potentially allow greater integration of the two utilities and eliminate some inefficiency that arises due to passing data between two separate processes.

One interesting and important use for exemplary embodiments as variously described herein for discerning memory leakage and identifying and recovering leaked memory is in high performance computing (HPC) systems. These systems employ a large number of processors that share access to a huge physical memory space. Such systems often execute long-running tasks that may suffer the ill effects of memory leaks after much progress has been made, with resultant huge penalties to throughput and overall productivity. For such systems, dual-stage software aging and rejuvenation (SAR) brings the benefits of continuous memory-leak detection (low overhead) followed by targeted, surgical mitigation (higher overhead, but very narrowly focused). This dual-stage approach affords even greater reduction in overhead when implemented on supercomputers that employ application checkpointing. Checkpointing also requires the temporary suspension of the target application in order to save a consistent snapshot of the memory space. Thus, a single suspension can service both checkpointing and the dual-stage memory leak detection and mitigation algorithm taught herein. Moreover, the same external storage space can be used for both checkpointing and SAR. Because supercomputers often set aside spare processing capacity or include support processors for I/O or other functions, the analysis of the checkpoint file by the memory leak detection algorithm can be done offline using this spare processing capacity, thus further minimizing any impact on the target application, which can resume immediately after the checkpoint file is completely saved. There is no difficulty with this delayed invocation of the memory leak detection algorithm because any leaked memory will never be accessed again by the target application by definition and thus can be detected and freed at any point in the future.

It will be understood that each block of the flowchart illustration(s), and combinations of blocks in the flowchart illustration(s), may be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration(s) support combinations of means for performing the specified actions, combinations of steps for performing the specified actions and program instruction means for performing the specified actions. It will also be understood that each block of the flowchart illustration(s), and combinations of blocks in the flowchart illustration(s), may be implemented by special purpose hardware-based systems which perform the specified actions or steps, or combinations of special purpose hardware and computer instructions.

The examples provided should not be construed as narrowing the embodiments of the invention, and are intended merely to provide a better understanding. Thus, other mechanisms may therefore be employed, without departing from the scope of the invention.

The above specification, examples, and data provide a complete description of the manufacture and use of the composition of the invention. Since many embodiments of the invention may be made without departing from the spirit and scope of the invention, the invention resides in the claims hereinafter appended.

What is claimed as new and desired to be protected by Letters Patent of the United States is:

1. A method for detecting and recovering leaked memory in a computer system, comprising:
   detecting memory leakage within the computer system based on nonlinear and non-parametric time-series regression analysis of software telemetry data generated by a first software process of a plurality of software processes running on an operating system executing on the computer system;
   in response to the detected memory leakage, halting the first software process, wherein a second software process of the plurality of software processes runs on the operating system executing on the computer system while the first software process is halted;
   generating a first core image file of the halted first software process;
   re-starting, by the operating system executing on the computer system, the halted first software process;
   identifying, based on the first core image file, first leaked memory from the re-started first software process; and
   recovering the identified first leaked memory.

2. The method of claim 1, wherein the software telemetry data comprises data indicating at least one of a group consisting of central processing unit utilization, memory usage, swap usage, and paging activity.

3. The method of claim 1, wherein the identifying the first leaked memory comprises:
   storing the first core image file to a disk operatively connected to the computer system; and
   implementing a mark-sweep algorithm using the stored first core image file.

4. The method of claim 1, wherein the first software process is halted in further response to expiration of a recurring time interval, and wherein a length of the recurring time interval is modified based on an amount of memory recovered at a previous expiration of the recurring time interval.

5. The method of claim 1, wherein the generating occurs during a checkpointing halt of the first software process.

6. The method of claim 1, wherein the analysis of the software telemetry data is performed via at least one of a group consisting of a kernel regression, a neural network, and a Kalman filter.

7. The method of claim 1, further comprising adjusting a sensitivity of the detecting based on a recovered amount of the identified first leaked memory.

8. A non-transitory computer readable storage medium comprising instructions for causing a computer to perform actions comprising:
   detecting memory leakage within the computer system based on nonlinear and non-parametric time-series regression analysis of software telemetry data generated by a first software process of a plurality of software processes running on an operating system executing on the computer system;
   in response to the detected memory leakage, halting the first software process, wherein a second software process of the plurality of software processes runs on the operating system executing on the computer system while the first software process is halted;
   generating a first core image file of the halted first software process;
   re-starting, by the operating system, the halted first software process on the computer system;
   identifying, based on the first core image file, first leaked memory from the re-started first software process; and
   recovering the identified first leaked memory.

9. The non-transitory computer readable storage medium of claim 8, wherein the software telemetry data comprises data indicating at least one of a group consisting of central processing unit utilization, memory usage, swap usage, and paging activity.

10. The non-transitory computer readable storage medium of claim 8, wherein the identifying the first leaked memory comprises:
    storing the first core image file to a disk operatively connected to the computer system; and
    implementing a mark-sweep algorithm using the stored first core image file.

11. The non-transitory computer readable storage medium of claim 8, wherein the actions further comprise:
    adjusting a sensitivity of the detecting based on a recovered amount of the identified first leaked memory.

12. The non-transitory computer readable storage medium claim 8, wherein the generating occurs during a checkpointing halt of the first software process.

13. A system for detecting and recovering leaked memory in a computer system, comprising:
    a computer processor;
    an operating system executing on the computer processor and comprising:
       a first module executing on the computer processor and configured to:
          detect memory leakage within the computer system based on nonlinear and non-parametric time-series regression analysis of software telemetry data generated by a first software process of a plurality of software processes running on the operating system; and
       a second module executing on the computer processor and configured to:
          halt the first software process in response to the detected memory leakage, wherein a second software process of the plurality of software processes runs on the operating system while the first software process is halted;
          generate a first core image file of the halted first software process;
          re-start the halted first software process on the computer system;

identify, based on the first core image file, first leaked memory from the first re-started software process; and recover the identified first leaked memory.

14. The system of claim 13, wherein the software telemetry data comprises data indicating at least one of a group consisting of central processing unit utilization, memory usage, swap usage, and paging activity.

15. The system of claim 13, wherein identifying the first leaked memory comprises:

stroring the first core image file to a disk operatively connected to the computer system; and implementing a mark-sweep algorithm using the stored first core image file.

16. The system of claim 13, wherein the first software process is halted in further response to expiration of a recurring time interval, and wherein a length of the recurring time interval is modified based on an amount of first leaked memory recovered at a previous expiration of the recurring time interval.

17. The system of claim 13, wherein the first module is further configured to adjust its sensitivity to memory leakage based on an amount of identified first leaked memory recovered by the second module.

* * * * *